(12) United States Patent
Nelson et al.

(10) Patent No.: US 8,859,089 B2
(45) Date of Patent: Oct. 14, 2014

(54) REINFORCED HOLLOW PROFILES

(75) Inventors: Sherri M. Nelson, Winona, MN (US);
David W. Eastep, Winona, MN (US);
Timothy A. Regan, Winona, MN (US)

(73) Assignee: Ticona LLC, Florence, KY (US)

( * ) Notice: Subject to any disclaimer, the term of this patent is extended or adjusted under 35 U.S.C. 154(b) by 22 days.

(21) Appl. No.: 13/698,375

(22) PCT Filed: Jun. 22, 2011

(86) PCT No.: PCT/US2011/041445
§ 371 (c)(1),
(2), (4) Date: Feb. 12, 2013

(87) PCT Pub. No.: WO2011/163357
PCT Pub. Date: Dec. 29, 2011

(65) Prior Publication Data
US 2013/0136877 A1    May 30, 2013

Related U.S. Application Data

(60) Provisional application No. 61/357,294, filed on Jun. 22, 2010.

(51) Int. Cl.
*B32B 27/04* (2006.01)
*B29C 70/08* (2006.01)
*B29C 70/52* (2006.01)

(52) U.S. Cl.
CPC .............. *B29C 70/521* (2013.01); *B29C 70/08* (2013.01); *B29C 70/52* (2013.01)
USPC ................... 428/297.4; 428/300.4; 428/300.7

(58) Field of Classification Search
CPC ........ B29C 70/08; B29C 70/521; B29C 70/52
USPC ............... 428/34.5, 36.4, 297.4, 300.4, 300.7
See application file for complete search history.

(56) References Cited

U.S. PATENT DOCUMENTS

| 3,669,158 | A | 6/1972 | Phillips |
| 4,394,338 | A | 7/1983 | Fuwa |
| 4,541,884 | A | 9/1985 | Cogswell et al. |
| 4,549,920 | A | 10/1985 | Cogswell et al. |

(Continued)

FOREIGN PATENT DOCUMENTS

| DE | 102007018052 | 10/2008 |
| EP | 0155552 | 9/1985 |

(Continued)

*Primary Examiner* — N. Edwards
(74) *Attorney, Agent, or Firm* — Dority & Manning, P.A.

(57) ABSTRACT

A hollow lineal profile (16) formed from a continuous fiber reinforced ribbon ("CFRT") that contains a plurality of continuous fibers embedded within a first thermoplastic polymer matrix (6). To enhance the tensile strength of the profile, the continuous fibers are aligned within the ribbon in a substantially longitudinal direction (e.g., the direction of pultrusion). In addition to continuous fibers, the hollow profile of the present invention also contains a plurality of long fibers that may be optionally embedded within a second thermoplastic matrix to form a long fiber reinforced thermoplastic ("LFRT") (4). The long fibers may be incorporated into the continuous fiber ribbon or formed as a separate layer of the profile. Regardless, at least a portion of the long fibers are oriented at an angle (e.g., 90°) to the longitudinal direction to provide increased transverse strength to the profile.

31 Claims, 14 Drawing Sheets

(56) References Cited

U.S. PATENT DOCUMENTS

| | | |
|---|---|---|
| 4,564,540 A | 1/1986 | Davies et al. |
| 4,588,538 A | 5/1986 | Chung et al. |
| 4,640,065 A | 2/1987 | Harris et al. |
| 4,681,722 A | 7/1987 | Carter et al. |
| 4,749,613 A | 6/1988 | Yamada et al. |
| 4,752,313 A | 6/1988 | Allaire et al. |
| 4,752,513 A | 6/1988 | Rau et al. |
| RE32,772 E | 10/1988 | Hawley |
| 4,792,481 A | 12/1988 | O'Connor et al. |
| 4,874,563 A | 10/1989 | McMahon et al. |
| 4,882,552 A | 11/1989 | Harris |
| 4,924,631 A | 5/1990 | Davies et al. |
| 4,938,823 A | 7/1990 | Balazek et al. |
| 4,984,402 A | 1/1991 | Davies |
| 4,992,229 A | 2/1991 | Beever |
| 5,026,410 A | 6/1991 | Pollet et al. |
| 5,026,447 A | 6/1991 | O'Connor |
| 5,091,036 A | 2/1992 | Taylor |
| 5,095,632 A | 3/1992 | Hassler, Jr. et al. |
| 5,098,496 A | 3/1992 | Breitigam et al. |
| 5,114,516 A | 5/1992 | Pilling et al. |
| 5,120,380 A | 6/1992 | Strachan |
| 5,122,417 A | 6/1992 | Murakami et al. |
| 5,128,198 A | 7/1992 | Dyksterhouse et al. |
| 5,174,844 A | 12/1992 | Tong |
| 5,198,172 A | 3/1993 | Spoo et al. |
| 5,225,020 A | 7/1993 | Millett et al. |
| 5,225,140 A | 7/1993 | Hayashikoshi et al. |
| 5,294,461 A | 3/1994 | Ishida |
| 5,324,377 A | 6/1994 | Davies |
| 5,336,526 A | 8/1994 | Spoo et al. |
| 5,401,154 A | 3/1995 | Sargent |
| 5,492,583 A | 2/1996 | Fingerson et al. |
| 5,492,743 A | 2/1996 | Schroll et al. |
| 5,503,928 A | 4/1996 | Cheshire |
| 5,520,867 A | 5/1996 | Shirai et al. |
| 5,534,210 A | 7/1996 | Shirai et al. |
| 5,540,986 A | 7/1996 | Kimura et al. |
| 5,552,215 A | 9/1996 | Tredway et al. |
| 5,556,496 A | 9/1996 | Sumerak |
| 5,585,155 A | 12/1996 | Heikkila et al. |
| 5,700,417 A | 12/1997 | Fernyhough et al. |
| 5,716,479 A | 2/1998 | Mikats et al. |
| 5,716,487 A | 2/1998 | Sumerak |
| 5,727,357 A | 3/1998 | Arumugasaamy et al. |
| 5,747,075 A | 5/1998 | Gauchel et al. |
| 5,779,961 A | 7/1998 | Teutsch |
| 5,783,013 A | 7/1998 | Beckman et al. |
| 5,792,529 A | 8/1998 | May |
| 5,830,304 A | 11/1998 | Priesnitz et al. |
| 5,882,564 A | 3/1999 | Puppin |
| 5,888,609 A * | 3/1999 | Karttunen et al. ............ 428/107 |
| 5,902,755 A | 5/1999 | Driggett et al. |
| 5,911,932 A | 6/1999 | Dyksterhouse |
| 5,935,508 A | 8/1999 | Fernyhough et al. |
| 6,007,656 A | 12/1999 | Heikkila et al. |
| 6,037,056 A | 3/2000 | Macdonald et al. |
| 6,045,876 A | 4/2000 | Fellers et al. |
| 6,048,427 A | 4/2000 | Gauchel et al. |
| 6,090,319 A | 7/2000 | Sharma et al. |
| 6,106,944 A | 8/2000 | Heikkila et al. |
| 6,122,877 A | 9/2000 | Hendrickson et al. |
| 6,185,962 B1 | 2/2001 | Hartman et al. |
| 6,260,251 B1 | 7/2001 | Guhl |
| 6,346,325 B1 | 2/2002 | Edwards et al. |
| 6,387,179 B1 | 5/2002 | Anderson et al. |
| 6,524,690 B1 | 2/2003 | Dyksterhouse |
| 6,656,316 B1 | 12/2003 | Dyksterhouse |
| 6,709,995 B1 | 3/2004 | Dyksterhouse |
| 6,746,747 B2 | 6/2004 | Davies et al. |
| 6,763,869 B2 | 7/2004 | Sakai et al. |
| 6,794,032 B2 | 9/2004 | Borgner et al. |
| 6,808,796 B1 | 10/2004 | Miyao et al. |
| 6,821,613 B1 | 11/2004 | Kagi et al. |
| 6,846,857 B1 | 1/2005 | Lindner |
| 6,854,791 B1 | 2/2005 | Jaggi |
| 6,872,273 B2 | 3/2005 | Davies et al. |
| 6,872,343 B2 | 3/2005 | Edwards et al. |
| 6,881,288 B2 | 4/2005 | Davies et al. |
| 6,955,735 B2 | 10/2005 | Kusek |
| 7,249,943 B2 | 7/2007 | Benson et al. |
| 7,276,132 B2 | 10/2007 | Davies et al. |
| 7,297,740 B2 | 11/2007 | Dyksterhouse |
| 7,387,147 B2 | 6/2008 | Johnson et al. |
| 7,402,268 B2 | 7/2008 | Boissonnat et al. |
| 7,413,623 B2 | 8/2008 | Raday |
| 7,470,388 B2 | 12/2008 | Hüsler et al. |
| 7,591,973 B2 * | 9/2009 | Takano et al. .................. 264/320 |
| 8,470,435 B2 * | 6/2013 | Takano et al. .............. 428/297.4 |
| 8,486,518 B2 * | 7/2013 | Takano et al. .............. 428/297.4 |
| 2001/0047844 A1 | 12/2001 | Edwards et al. |
| 2002/0061374 A1 | 5/2002 | O'Brien et al. |
| 2002/0110680 A1 | 8/2002 | Bank et al. |
| 2002/0123288 A1 | 9/2002 | Davies et al. |
| 2003/0003265 A1 | 1/2003 | Davies et al. |
| 2004/0009338 A1 | 1/2004 | Jo et al. |
| 2005/0008804 A1 | 1/2005 | Davies et al. |
| 2006/0165955 A1 | 7/2006 | Ruegg et al. |
| 2006/0280938 A1 | 12/2006 | Atkinson |
| 2007/0113958 A1 | 5/2007 | Brown et al. |
| 2007/0113983 A1 | 5/2007 | Brown et al. |
| 2007/0116941 A1 | 5/2007 | Brown et al. |
| 2007/0125301 A1 | 6/2007 | Zhou et al. |
| 2007/0126142 A1 | 6/2007 | Zhou et al. |
| 2007/0183843 A1 | 8/2007 | Spaans et al. |
| 2007/0243368 A1 * | 10/2007 | Edwards ...................... 428/292.1 |
| 2008/0053596 A1 | 3/2008 | Davies et al. |
| 2008/0081862 A1 * | 4/2008 | Lustiger et al. ................ 524/425 |
| 2008/0300355 A1 | 12/2008 | Kenny et al. |
| 2009/0011210 A1 | 1/2009 | Gao et al. |
| 2009/0023870 A1 | 1/2009 | Berksoy et al. |
| 2009/0071593 A1 | 3/2009 | Slaback et al. |
| 2009/0104418 A1 | 4/2009 | Ohki et al. |
| 2009/0123693 A1 | 5/2009 | Paul |
| 2009/0206515 A1 | 8/2009 | Jansen et al. |
| 2009/0324923 A1 | 12/2009 | Gleich et al. |
| 2010/0108812 A1 | 5/2010 | Boursier et al. |
| 2011/0049750 A1 | 3/2011 | Bechtold |
| 2012/0261158 A1 * | 10/2012 | Daniel et al. ................ 174/102 A |
| 2013/0136877 A1 * | 5/2013 | Nelson et al. ................ 428/34.5 |
| 2013/0136891 A1 * | 5/2013 | Nelson et al. .................. 428/114 |
| 2014/0034350 A1 * | 2/2014 | Nelson et al. .................... 174/47 |
| 2014/0102760 A1 * | 4/2014 | Nelson et al. ............... 174/126.2 |
| 2014/0106166 A1 * | 4/2014 | Nelson et al. .................. 428/367 |

FOREIGN PATENT DOCUMENTS

| | | |
|---|---|---|
| EP | 0281447 | 9/1988 |
| EP | 0444867 | 9/1991 |
| FR | 2266595 | 10/1975 |
| GB | 1302049 | 1/1973 |
| GB | 2041489 | 9/1980 |
| GB | 2262470 | 6/1993 |
| GB | 2448363 | 10/2008 |
| JP | H09-155862 | 6/1997 |
| WO | 92/03277 | 3/1992 |
| WO | 00/78529 | 12/2000 |
| WO | 2004/080698 | 9/2004 |
| WO | 2006/044315 | 4/2006 |

* cited by examiner

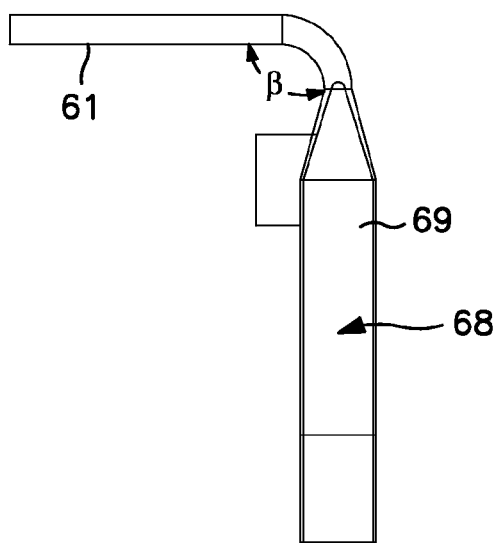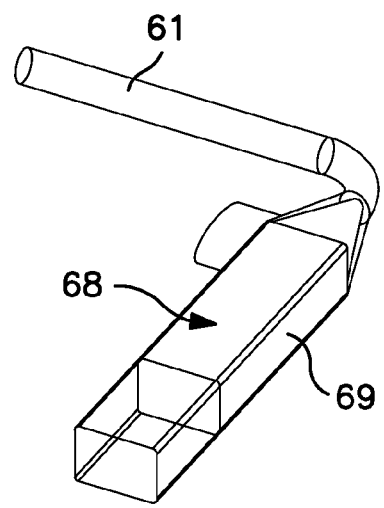
FIG. 6    FIG. 7

REINFORCED HOLLOW PROFILES

RELATED APPLICATIONS

The present application claims priority to Provisional Application Ser. No. 61/357,294, filed on Jun. 22, 2010, the entire contents of which are incorporated herein by reference thereto.

BACKGROUND OF THE INVENTION

Hollow profiles have been formed by pulling ("pultruding") continuous fibers through a resin and then shaping the fiber-reinforced resin within a pultrusion die. Because the profiles have continuous fibers oriented in the machine direction (longitudinal), they often exhibit a high tensile strength in the machine direction. The transverse strength of such hollow profiles is, however, often poor, which can cause the material to split when a stress is applied in a cross-machine direction (transverse). In this regard, various attempts have been made to strengthen hollow profiles in the transverse direction. For example, U.S. Pat. No. 7,514,135 to Davies, et al. describes a hollow part formed by providing a first layer of reinforcing rovings extending in a longitudinal pultrusion direction and forming a second layer on the first layer, the second layer containing at least some reinforcing fibers that extend in the transverse direction. One problem with this method, however, it is that it relies upon a thermoset resin to help achieve the desired strength properties. Such resins are difficult to use during manufacturing and do not always possess good bonding characteristics for forming layers with other materials. Furthermore, the method described therein is also problematic in that it is difficult to apply the transverse fibers at selective locations (e.g., where they are needed).

As such, a need currently exists for a hollow profile that exhibits good transverse strength and that can be made in a relatively efficient and simple manner.

SUMMARY OF THE INVENTION

In accordance with one embodiment of the present invention, a hollow lineal profile is disclosed. The profile comprises a consolidated ribbon that contains a plurality of continuous fibers embedded within a first thermoplastic matrix and substantially oriented in a longitudinal direction. The profile also comprises a plurality of long fibers, at least a portion of which are oriented at an angle relative to the longitudinal direction. The ratio of the weight of the continuous fibers to the ratio of the weight of the long fibers is from about 0.2 to about 10. Further, the ratio of flexural modulus to the maximum flexural strength of the profile is from about 50 to about 2200.

In accordance with another embodiment of the present invention, a method for forming a pultruded hollow profile is disclosed. The method comprises impregnating a plurality of continuous fibers with a thermoplastic matrix within an extrusion device; consolidating the impregnated fibers to form a first ribbon in which the continuous fibers are oriented in a longitudinal direction; pultruding the first ribbon and at least a second ribbon through a die to form the hollow profile, wherein the first ribbon, the second ribbon, or both contain long fibers.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6 is a top view of one embodiment of a mandrel that may be employed in the present invention to shape the long fiber layer, wherein the flow of the long fiber material is also illustrated as it passes over the mandrel;

FIG. 7 is a perspective view of the mandrel section of FIG. 6;

FIG. 10 is another perspective view of the mandrel section of FIG. 8, in which

Figure 1:
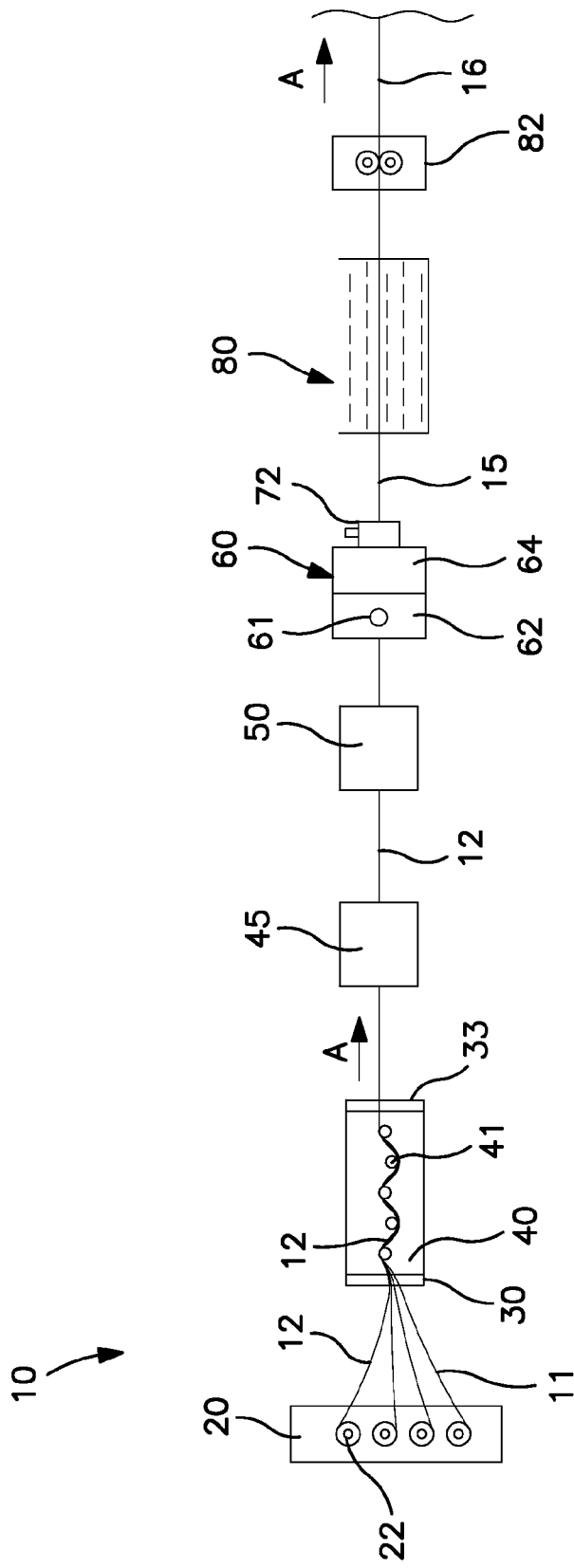
FIG. 1 is a schematic illustration of one embodiment of a pultrusion system that may be employed in the present invention.

Repeat use of reference characters in the present specification and drawings is intended to represent the same or analogous features or elements of the present invention.

Detailed Description of Representative Embodiments

Definitions

As used herein, the term "profile" generally refers to a pultruded part. The profile may possess a wide variety of cross-sectional shapes, such as square, rectangular, circular, elliptical, triangular, I-shaped, C-shaped, U-shaped, J-shaped, L-shaped, slotted, etc. Such profiles may be employed as a structural member for window lineals, decking planks, railings, balusters, roofing tiles, siding, trim boards, pipe, fencing, posts, light posts, highway signage, roadside marker posts, etc.

As used herein, the term "hollow" generally means that at least a portion of the interior of the profile is a voided space. The voided space may optionally extend the entire the length of the profile.

As used herein, the term "continuous fibers" generally refers to fibers, filaments, yarns, or rovings (e.g., bundles of fibers) having a length that is generally limited only by the length of the part. For example, such fibers may have a length greater than about 25 millimeters, in some embodiments about 50 millimeters or more, and in some embodiments, about 100 millimeters or more.

As used herein, the term "long fibers" generally refers to fibers, filaments, yarns, or rovings that are not continuous and typically have a length of from about 0.5 to about 25 millimeters, in some embodiments, from about 0.8 to about 15 millimeters, and in some embodiments, from about 1 to about 12 millimeters.

Detailed Description

It is to be understood by one of ordinary skill in the art that the present discussion is a description of exemplary embodiments only, and is not intended as limiting the broader aspects of the present invention.

Generally speaking, the present invention is directed to a hollow lineal profile formed from a continuous fiber reinforced ribbon ("CFRT") that contains a plurality of continuous fibers embedded within a first thermoplastic polymer matrix. To enhance the tensile strength and modulus of the profile, the continuous fibers are aligned within the ribbon in a substantially longitudinal direction (e.g., the direction of pultrusion). In addition to continuous fibers, the hollow profile of the present invention also contains a plurality of long fibers that may be optionally embedded within a second thermoplastic matrix to form a long fiber reinforced thermoplastic ("LFRT"). The long fibers may be incorporated into the continuous fiber ribbon or formed as a separate layer of the profile. Regardless, at least a portion of the long fibers are oriented at an angle (e.g., 90°) relative to the longitudinal direction to provide increased transverse strength to the profile.

To achieve a good balance between tensile strength and transverse strength, the present inventors have discovered that the relative proportion of the continuous and long fibers may be selectively controlled. Namely, the ratio of the weight of continuous fibers to the weight of long fibers is within the range of from about 0.2 to about 10, in some embodiments from about 0.4 to about 5, and in some embodiments, from about 0.5 to about 4. For instance, continuous fibers may constitute from about 10 wt. % to about 90 wt. %, in some embodiments from about 20 wt. % to about 70 wt. %, and in some embodiments, from about 30 wt. % to about 60 wt. % of the profile. Likewise, long fibers may constitute from about 0.5 wt. % to about 50 wt. %, in some embodiments from about 1 wt. % to about 40 wt. %, and in some embodiments, from about 2 wt. % to about 30 wt. % of the profile.

The resulting hollow profiles of the present invention may therefore exhibit a relatively high maximum flexural strength (in the transverse direction) in comparison to profiles having the same shape and size, but lacking the long fiber reinforcement of the present invention. For example, the maximum flexural strength (also known as the modulus of rupture or bend strength) may be about 12 Megapascals ("MPa") or more, in some embodiments from about 15 to about 50 MPa, and in some embodiments, from about 20 to about 40 MPa. The term "maximum flexural strength" generally refers to the maximum stress reached on a stress-strain curve produced by a "three point flexural" test (such as ASTM D790-10, Procedure A or ISO 178) in the transverse direction at room temperature. It represents the ability of the material to withstand an applied stress in the transverse direction to failure. Likewise, the profile may also exhibit a high flexural modulus. The term "flexural modulus" generally refers to the ratio of stress to strain in flexural deformation (units of force per area), or the tendency for a material to bend. It is determined from the slope of a stress-strain curve produced by a "three point flexural" test (such as ASTM D790-10, Procedure A or ISO 178). For example, the profile of the present invention may exhibit a flexural modulus of about 2 Gigapascals ("GPa") or more, in some embodiments from about 2 to about 25 GPa, in some embodiments from about 4 to about 20 GPa, and in some embodiments, from about 5 to about 15 GPa.

The actual values for modulus and strength may of course vary depending on the desired application. Nevertheless, the ratio of the flexural modulus to the maximum flexural strength typically falls within a certain range to achieve a part that exhibits a balance between tensile strength and modulus properties, as well as transverse strength. This ratio, for example, typically ranges from about 50 to about 2200, in some embodiments from about 100 to about 1000, in some embodiments from about 200 to about 800, and in some embodiments, from about 250 to about 600.

The profile may also have a very low void fraction, such as about 3% or less, in some embodiments about 2% or less, and in some embodiments, about 1% or less. The void fraction may be determined in the manner described above, such as using a "resin burn off" test in accordance with ASTM D 2584-08.

The continuous fibers employed in the hollow profile of the present invention may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable for use in the continuous fibers. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Any of a variety of thermoplastic polymers may also be employed to form the first thermoplastic matrix in which the continuous fibers are embedded. Suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth. Polypropylene is a particularly suitable thermoplastic polymer.

The continuous fiber ribbon is generally formed in a manner to minimize its void fraction and ensure good impregnation. In this regard, an extrusion device may be employed in the present invention to embed the continuous fibers into a thermoplastic matrix. Among other things, the extrusion device facilitates the ability of the thermoplastic polymer to be applied to the entire surface of the fibers. For instance, the void fraction may be about 3% or less, in some embodiments about 2% or less, and in some embodiments, about 1% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the thermoplastic matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the thermoplastic matrix (e.g., at the appropriate crystallinity);

$\rho_f$ is the density of the fibers;

$W_f$ is the weight fraction of the fibers; and $W_m$ is the weight fraction of the thermoplastic matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the thermoplastic polymer, fibers, and ribbon in accordance with ASTM D 2734-09 (Method A), where the densities may be determined ASTM D792-08 Method A. Of course, the void fraction can also be estimated using conventional microscopy equipment.

Figure 2:
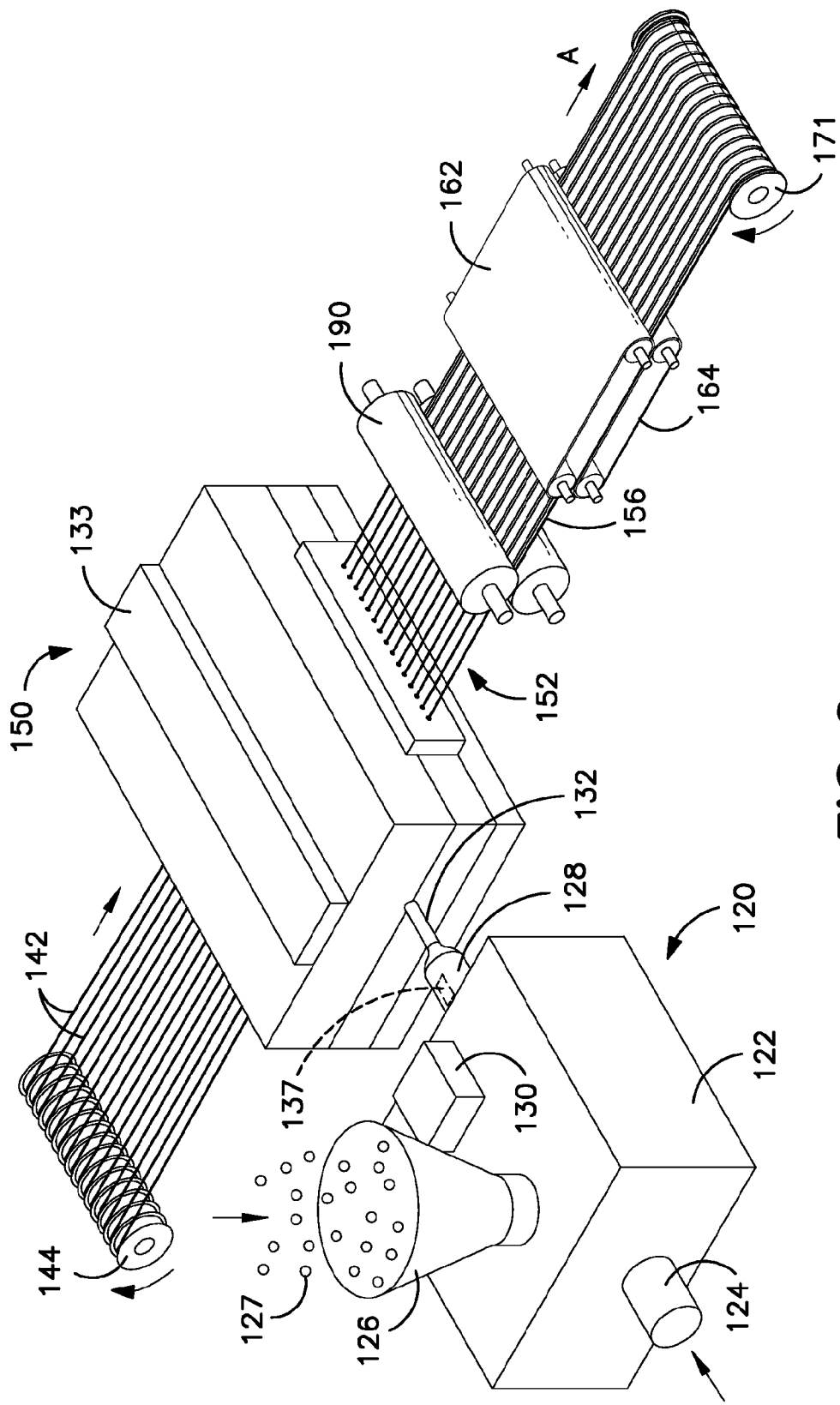
FIG. 2 is a schematic illustration of one embodiment of an impregnation system for use in the present invention.

Referring to FIG. 2, one embodiment of an extrusion device is shown that may be employed for impregnating the fibers with a thermoplastic polymer. More particularly, the apparatus includes an extruder 120 containing a screw shaft 124 mounted inside a barrel 122. A heater 130 (e.g., electrical resistance heater) is mounted outside the barrel 122. During use, a thermoplastic polymer feedstock 127 is supplied to the extruder 120 through a hopper 126. The thermoplastic feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The rovings 142 are generally kept apart a certain distance before impregnation, such as at least about 4 millimeters, and in some embodiments, at least about 5 millimeters. The feedstock 127 may further be heated inside the die by heaters 133 mounted in or around the die 150. The die is generally operated at temperatures that are sufficient to cause melting and impregnation of the thermoplastic polymer. Typically, the operation temperatures of the die is higher than the melt temperature of the thermoplastic polymer, such as at temperatures from about 200° C. to about 450° C. When processed in this manner, the continuous fiber rovings 142 become embedded in the polymer matrix, which may be a resin 214 (FIG. 3A) processed from the feedstock 127. The mixture is then extruded from the impregnation die 150 to create an extrudate 152.

A pressure sensor 137 (FIG. 3A) senses the pressure near the impregnation die 150 to allow control to be exerted over the rate of extrusion by controlling the rotational speed of the screw shaft 124, or the federate of the feeder. That is, the pressure sensor 137 is positioned near the impregnation die 150 so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping, or guiding section (not shown) before entering a nip formed between two adjacent rollers 190. Although optional, the rollers 190 can help to consolidate the extrudate 152 into the form of a ribbon (or tape), as well as enhance fiber impregnation and squeeze out any excess voids. In addition to the rollers 190, other shaping devices may also be employed, such as a die system. The resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, rod, etc. The contact surfaces 252 are also typically made of a metal material.

Figure 3A:
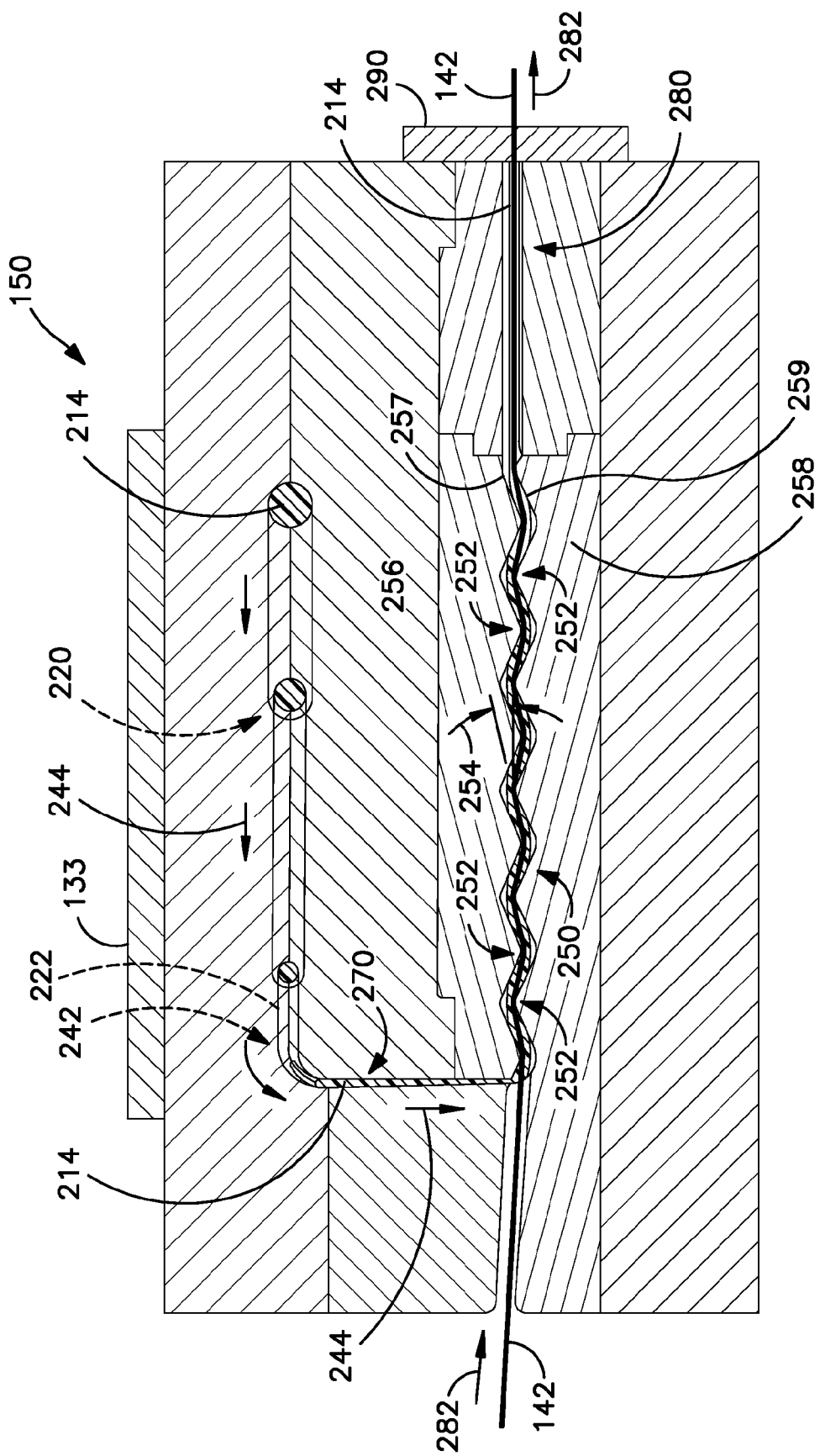
FIG. 3A is a cross-sectional view of the impregnation die shown in FIG. 2.

FIG. 3A shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

Figure 3B:
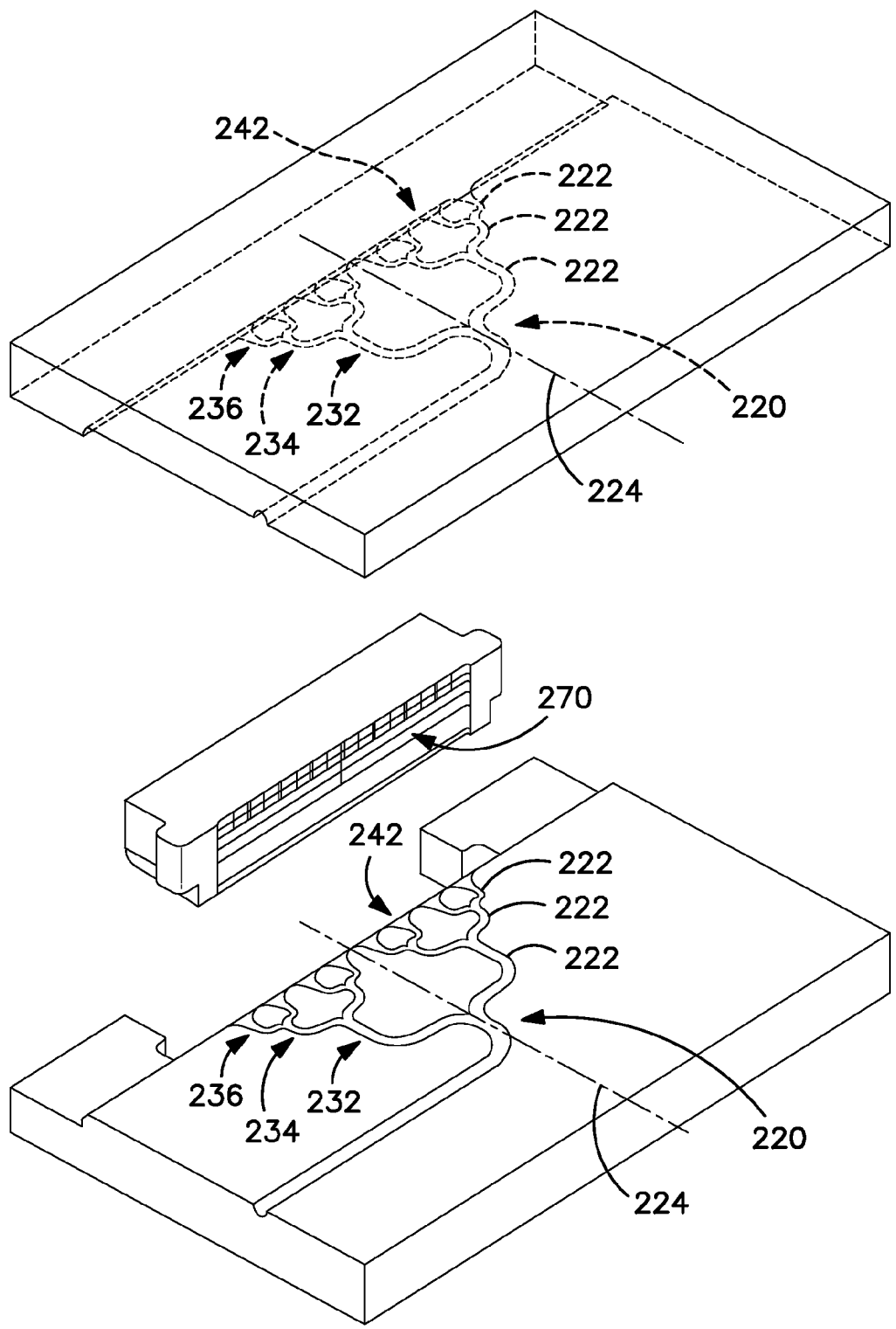
FIG. 3B is an exploded view of one embodiment of a manifold assembly and gate passage for an impregnation die that may be employed in the present invention.

As shown in FIG. 3B, some portions of the channels 222 may be curvilinear, and in exemplary embodiments, the channels 222 have a symmetrical orientation along a central axis 224. Further, in some embodiments, the channels may be a plurality of branched runners 222, which may include first branched runner group 232, second group 234, third group 236, and, if desired, more branched runner groups. Each group may include 2, 3, 4 or more runners 222 branching off from runners 222 in the preceding group, or from an initial channel 222.

The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242, which generally encompasses at least a downstream portion of the channels or runners 222 from which the resin 214 exits. In some embodiments, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142.

As further illustrated in FIGS. 3A and 3B, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough, as shown.

Upon exiting the manifold assembly 220 and the gate passage 270 of the die 150 as shown in FIG. 3A, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214.

Figure 3C:
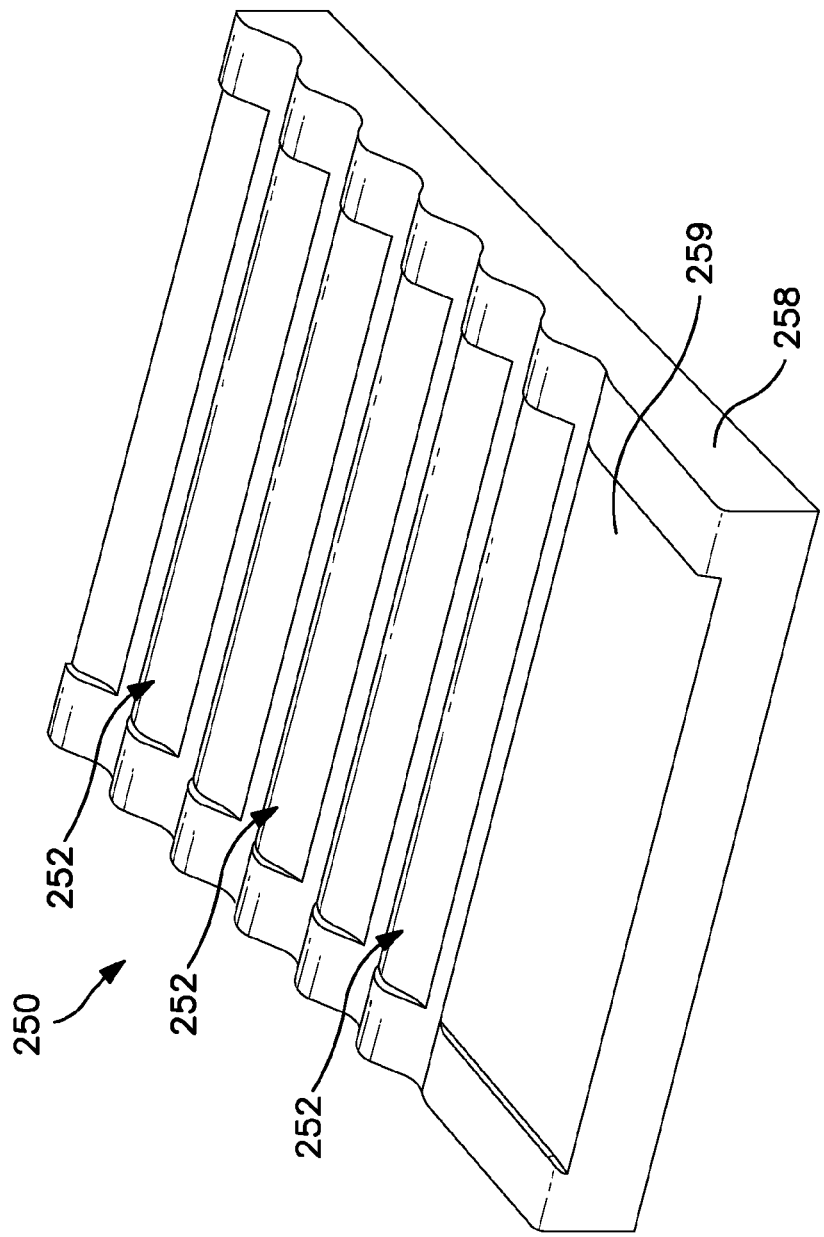
FIG. 3C is a perspective view of one embodiment of a plate at least partially defining an impregnation zone that may be employed in the present invention.

As shown in FIG. 3A, the coated rovings 142 are traversed in run direction 282 through impregnation zone 250, which is configured to impregnate the rovings 142 with the resin 214. For example, as shown in FIGS. 3A and 3C, the rovings 142 are traversed over contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 3A, the impregnation zone 250 is defined between two spaced apart opposing plates 256 and 258. First plate 256 defines a first inner surface 257, while second plate 258 defines a second inner surface 259. The contact surfaces 252 may be defined on or extend from both the first and second inner surfaces 257 and 259, or only one of the first and second inner surfaces 257 and 259. FIG. 3C illustrates the second plate 258 and the various contact surfaces thereon that form at least a portion of the impregnation zone 250 according to these embodiments. In exemplary embodiments, as shown in FIG. 3A, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

The angle 254 at which the rovings 142 traverse the contact surfaces 252 may be generally high enough to enhance shear, but not so high to cause excessive forces that will break the fibers. Thus, for example, the angle 254 may be in the range between approximately 1° and approximately 30°, and in some embodiments, between approximately 5° and approximately 25°.

In alternative embodiments, the impregnation zone 250 may include a plurality of pins (not shown), each pin having a contact surface 252. The pins may be static, freely rotational, or rotationally driven. In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 3A, in some embodiments, a land zone 280 may be positioned downstream of the impregnation zone 250 in run direction 282 of the rovings 142. The rovings 142 may traverse through the land zone 280 before exiting the die 150. As further shown in FIG. 3A, in some embodiments, a faceplate 290 may adjoin the impregnation zone 250. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

Regardless of the technique employed, the continuous fibers are oriented in the longitudinal direction (the machine direction "A" of the system of FIG. 1) to enhance tensile strength. Besides fiber orientation, other aspects of the ribbon and pultrusion process are also controlled to achieve the desired strength. For example, a relatively high percentage of continuous fibers may be employed in the ribbon to provide enhanced strength properties. For instance, continuous fibers typically constitute from about 40 wt. % to about 90 wt. %, in some embodiments from about 50 wt. % to about 85 wt. %, and in some embodiments, from about 55 wt. % to about 75 wt. % of the ribbon. Likewise, thermoplastic polymer(s) typically constitute from about 10 wt. % to about 60 wt. %, in some embodiments from about 15 wt. % to about 50 wt. %, and in some embodiments, from about 25 wt. % to about 45 wt. % of the ribbon.

Furthermore, a combination of multiple continuous fibers ribbons may be employed that are laminated together to form a strong, integrated structure having the desired thickness. The number of ribbons employed may vary based on the desired thickness and strength of the profile, as well as the nature of the ribbons themselves. In most cases, however, the number of ribbons is from 2 to 40, in some embodiments from 3 to 30, and in some embodiments, from 4 to 25.

As stated above, the hollow profile also contains a plurality of long fibers optionally embedded within a second thermoplastic matrix. The long fibers may be formed from any of the material, shape, and/or size as described above with respect to the continuous fibers. Glass fibers and carbon fibers are particularly desirable for use as the long fibers. Furthermore, the second thermoplastic matrix in which the long fibers may optionally be embedded may include a thermoplastic polymer, such as described above. It should be understood that the first thermoplastic matrix employed for the continuous fibers may be the same or different than the second thermoplastic matrix employed for the long fibers. In one embodiment, for example, the long fibers are separately impregnated with a thermoplastic polymer, such as in a manner described below, and thereafter cooled and chopped into to pellets having a length of about 25 millimeters or less. These pellets may be subsequently combined with a continuous fiber ribbon. Regardless, at least a portion of the long fibers in the hollow profile are oriented at an angle relative to the longitudinal direction (i.e., pultrusion direction) to provide increased transverse strength. For example, about 10% or more, in some embodiments about 20% or more, and in some embodiments, about 30% or more of the fibers may be oriented at an angle relative to the longitudinal direction. This angle may, for instance, be about 10° to about 120°, in some embodiments from about 20° to about 110° C., and in one embodiment, about 90°. This may be accomplished by intentionally orienting the fibers in the desired direction, or by random distribution.

The manner in which the long fibers and the continuous fiber ribbon are combined together to form the hollow profile of the present invention may vary depending on the intended application and the locations of the profile in which increased strength is required. In one embodiment, for example, the long fiber material is formed as a separate layer from the continuous fiber ribbon. Among other things, this allows the long fiber material to be selectively added at only those locations where increased transverse strength is most needed.

Referring to FIG. 1, one particular embodiment of a system is shown in which one or more continuous fiber ribbons 12 are initially provided in a wound package on a creel 20. The creel 20 may be an unreeling creel that includes a frame provided with horizontal rotating spindles 22, each supporting a package. A pay-out creel may also be employed, particularly if desired to induce a twist into the fibers. It should also be understood that the ribbons may also be formed in-line with the formation of the profile. In one embodiment, for example, the extrudate 152 exiting the impregnation die 150 from FIG. 2 may be directly supplied to the system used to form a profile. A tension-regulating device 40 may also be employed to help control the degree of tension in the ribbons 12. The device 40 may include inlet plate 30 that lies in a vertical plane parallel to the rotating spindles 22 of the creel 20. The tension-regulating device 40 may contain cylindrical bars 41 arranged in a staggered configuration so that the ribbons 12 passes over and under these bars to define a wave pattern. The height of the bars can be adjusted to modify the amplitude of the wave pattern and control tension.

If desired, the ribbons 12 may be heated in an oven 45 having any of a variety of known configuration, such as an infrared oven, convection oven, etc. During heating, the fibers are unidirectionally oriented to optimize the exposure to the heat and maintain even heat across the entire profile. The temperature to which the ribbons 12 are heated is generally high enough to soften the thermoplastic polymer to an extent that the ribbons can bond together. However, the temperature is not so high as to destroy the integrity of the material. The temperature may, for example, range from about 100° C. to about 300° C., in some embodiments from about 110° C. to about 275° C., and in some embodiments, from about 120° C. to about 250° C. In one particular embodiment, for example, acrylonitrile-butadiene-styrene (ABS) is used as the polymer, and the ribbons are heated to or above the melting point of ABS, which is about 105° C. In another embodiment, polybutylene terephalate (PBT) is used as the polymer, and the ribbons are heated to or above the melting point of PBT, which is about 224° C.

Figure 4:
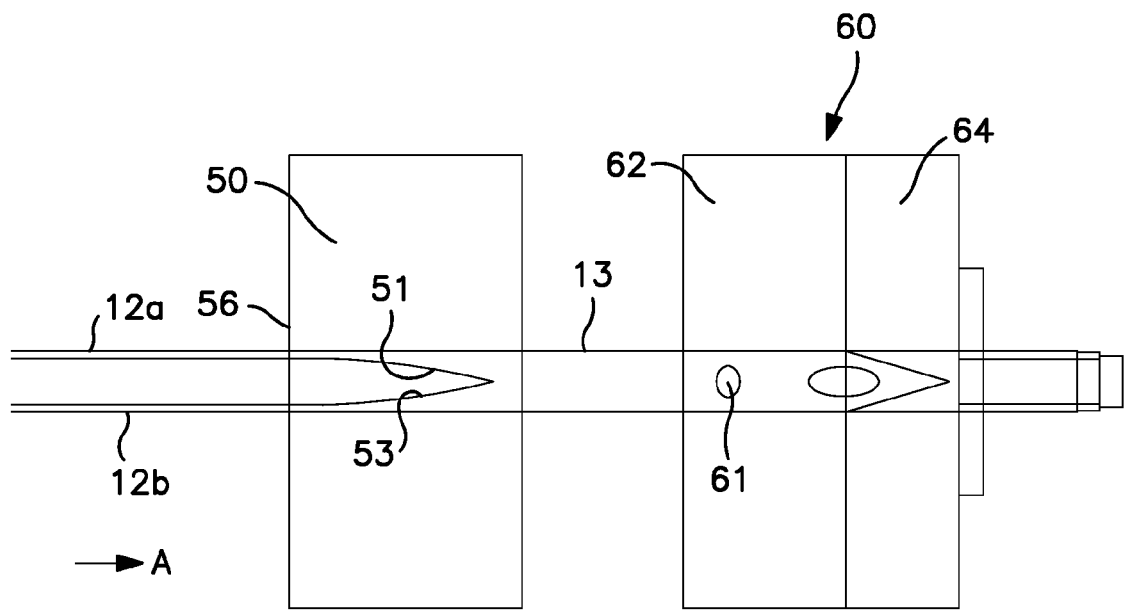
FIG. 4 is a side view of one embodiment of pre-shaping and pultrusion dies that may be employed in the present invention, wherein the flow of the continuous and long fiber materials are illustrated as they pass through the dies.
Figure 5:
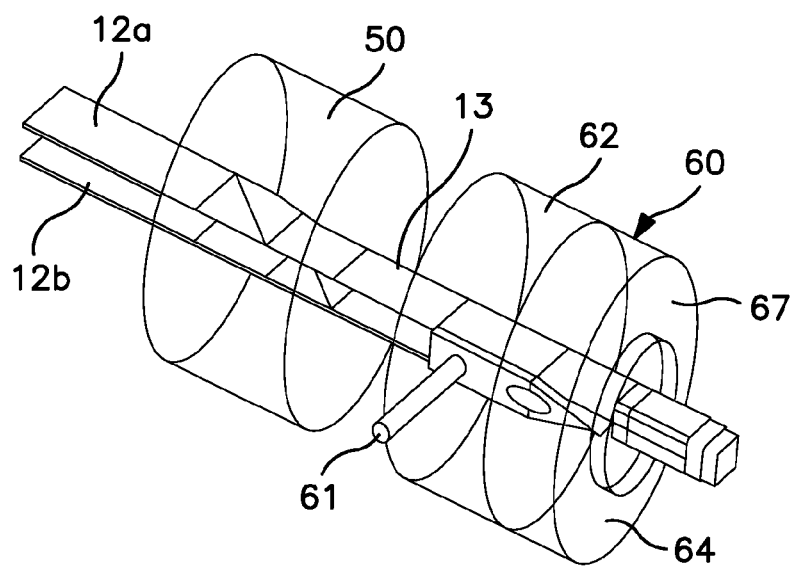
FIG. 5 is a perspective view of the dies of FIG. 4.

Upon being heated, the continuous fiber ribbons 12 may be provided to a consolidation die to help bond together different ribbon layers, as well as for alignment and formation of the initial shape of the profile. Referring to FIGS. 1, 4, and 5, for example, one embodiment of a consolidation die 50 for use in forming a "hollow" profile is shown in more detail. Although referred to herein as a single die, it should be understood that the consolidation die 50 may in fact be formed from multiple individual dies (e.g., face plate dies). In this particular embodiment, the consolidation die 50 receives a first layer (or laminate) 12a of continuous fiber ribbons and a second layer (or laminate) 12b of continuous fiber ribbons at an inlet end 56. The ribbons within each layer are bonded together and guided through channels (not shown) of the die 50 in a direction "A". The channels may be provided in any of a variety of orientations and arrangements to result in the desired reinforcement scheme. In the illustrated embodiment, for example, the layers 12a and 12b are initially spaced apart from each other in the vertical direction. As they pass through the channels of the die 50, the widths of the layers 12a and/or 12b are optionally ribboned to help prevent pressure wedges, and to keep the continuous fibers aligned and twist-free. Within the die 50, the ribbons are generally maintained at a temperature at or above the melting point of the thermoplastic matrix used in the ribbon to ensure adequate consolidation.

Although not specifically shown in FIGS. 1, 4, and 5, a mandrel may also be provided in the interior of the consolidation die 50 to help guide the laminates 12a and 12b into contact with each other on at least one side of the profile. In the illustrated embodiment, for example, a side portion 57 of the first layer 12a and a side portion 53 of the second layer 12b are angled so that they contact each other and form a side of the hollow profile. The other side of the profile is, however, typically left open within the consolidation die 50 so that the discontinuous fiber material can be subsequently applied to the interior of the profile in the pultrusion die. Of course, for those embodiments in which the discontinuous fiber material is not applied to the interior of the hollow profile, the consolidation die 50 may not be employed at all as the entire profile can be optionally shaped within the pultrusion die.

When in the desired position, the layers 12a and 12b of continuous fiber material are pulled into a pultrusion die 60. It is generally desired that the layers are allowed to cool briefly after exiting the consolidation die 50 and before entering the pultrusion die 60. This allows the consolidated laminate to retain its initial shape before progressing further through the system. Such cooling may be accomplished by simply exposing the layers to the ambient atmosphere (e.g., room temperature) or through the use of active cooling techniques (e.g., water bath or air cooling) as is known in the art. In one embodiment, for example, air is blown onto the layers (e.g., with an air ring). The cooling between these stages, however, generally occurs over a small period of time to ensure that the layers are still soft enough to be further shaped. For example, after exiting the consolidation die 50, the layers may be exposed to the ambient environment for only from about 1 to about 20 seconds, and in some embodiments, from about 2 to about 10 seconds, before entering the second die 60.

The configuration of the pultrusion die 60 depends in part on the desired shape and properties for the resulting profile. For hollow profiles, for example, the pultrusion die often contains a mandrel within its interior so that the fiber material flows between the interior surface of the die and the external surface of the mandrel to form the desired shape. Solid profiles, however, are typically formed without a mandrel. Further, although referred to herein as a single die, it should be understood that the pultrusion die 60 may be formed from multiple individual dies. In fact, the pultrusion die may preferably employ a first die section in which the discontinuous material is supplied and shaped a second die section in which the continuous fiber material is shaped. In FIGS. 4-5, for example, a first die section 62 is employed that supplies and shapes discontinuous fiber material 61 and a second die section 64 is employed that shapes the continuous fiber layers 12a and 12b.

Figure 8:
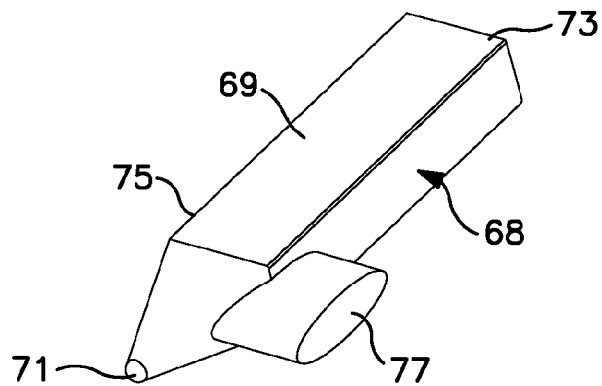
FIG. 8 is an exploded perspective view of one embodiment of a mandrel section that may be employed in the present invention to shape the continuous fiber layer, wherein the flow of the continuous fiber material is also illustrated as it passes over the mandrel.

The particular manner in which the long fiber material 61 is supplied to the first die section 62 is shown in more detail in FIGS. 6-8. As shown, a long fiber material 61 enters the first die section 62 and is curved into its interior cavity. Although not required, such a curved inlet allows the long fiber material 61 to gradually flow into in the direction "A" and toward a die outlet 67. In such embodiments, the angle β at which the long fiber material is provided relative to the flow direction "A" of the continuous fiber layers 12a and 12b may generally vary, but is typically about 45° or more, in some embodiments about 60° or more, and in some embodiments, from about 75° to about 90°. In certain cases, a non-perpendicular flow angle may be advantageous because it minimizes or overcomes backpressure in the die that may be caused by the high pressure flow of the long fiber material, which can sometimes lead to an undesirable backflow. The angled input orientation of the long fiber material, in combination with its curved configuration, may also reduce the likelihood that static spots (dead spots) may form inside the die, which may cause resin degradation, fiber hang-up, or breakage.

Upon entering the first die section 62, the discontinuous material 61 also flows over a mandrel 68. The mandrel 68 may be supported in a cantilever manner so that it resists the forward force of the continuous material being pulled around and over the mandrel. Further, although the entire mandrel is not shown herein, it should be understood that it may nevertheless extend into the aforementioned consolidation die 50 to help "pre-shape" the continuous fiber material in the manner described above. Regardless, the mandrel 68 shown in FIGS. 6-8 possesses multiple sections for accomplishing the desired shaping of the profile. More particularly, the mandrel 68 contains a first mandrel section 69 that is solid and generally rectangular in cross-section. Thus, the discontinuous material 61 passes over and around the mandrel section 69 from its proximal end 71 to its distal end 73. In doing so, the material 61 assumes the shape defined between the interior surface of the first die section 62 and an external surface 75 of the mandrel section 69, which in this embodiment, is a hollow rectangular shape.

Figure 9:
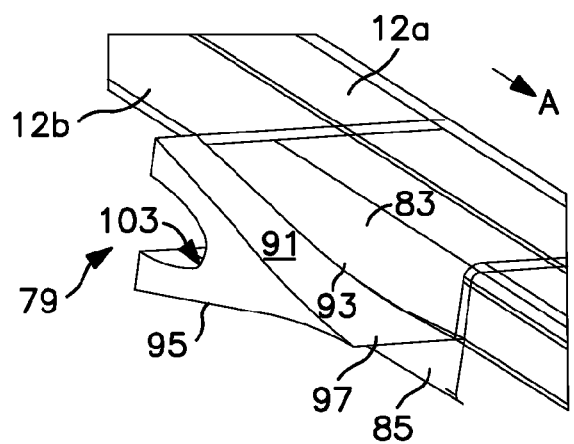
FIG. 9 is a perspective view of the mandrel section of FIG. 8.
Figure 10A:
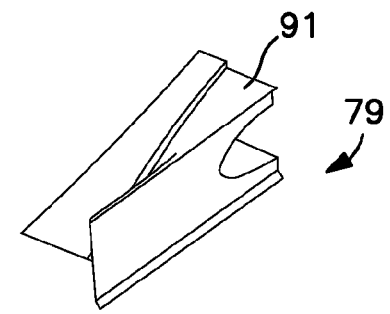
FIG. 10A shows a right perspective view and FIG. 10B shows a left perspective view of the mandrel section.
Figure 10B:
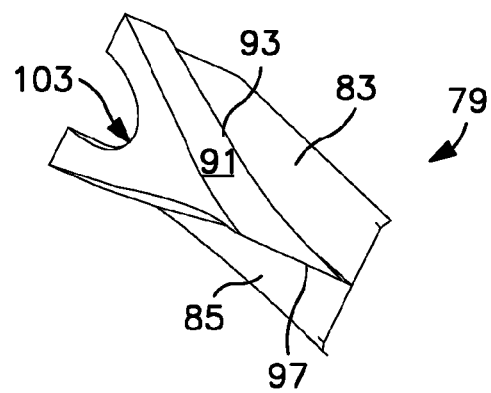

The final shape of the continuous fiber layer is formed in the second die section 64 of the pultrusion die 60, over and around a second section 79 of the mandrel 68 as shown in FIGS. 9-10. The second mandrel section 79 contains a U-shaped recess 103 that engages a protrusion 77 of the first mandrel section 69 for connecting thereto. In this embodiment, the second mandrel section 79 also contains an upper wall 83 and lower wall 85 that are generally perpendicular to the direction "A" of material flow. An upwardly facing surface 91 intersects a curved edge 93 of the upper wall 83 and slopes axially in the direction "A". Similarly, a downwardly facing surface 95 intersects a curved edge of the lower wall 85 and slopes axially in the direction "A". The surfaces 91 and 95 both converge at an edge 97. During formation of the profile, the first layer 12a of continuous fiber material is pulled over the surface 91 and assumes the shape defined between an interior surface of the pultrusion die 60 and the upper wall 83. The second layer 12b of continuous fiber material is pulled over the surface 95 and likewise assumes the shape defined between an interior surface of the pultrusion die 60 and the lower wall 85. The layer 12a and 12b are also gradually pulled into contact with each other at the edge 97 to form one side of the resulting profile. If necessary, the materials may be subjected to a subsequent compression step, such as in a land die section (not shown), to further increase the degree of adhesion between the layers at their edges.

Within the die 60, the ribbons are generally maintained at a temperature well above the melting point of the thermoplastic matrix used in the ribbon to facilitate the ability to shape the part and intermix together the discontinuous fiber material. However, the temperature is not so high as to destroy the integrity of the material. The temperature may, for example, range from about 100° C. to about 350° C., in some embodiments from about 120° C. to about 320° C., and in some embodiments, from about 150° C. to about 300° C.

If desired, the resulting profile may also be applied with a capping layer to enhance the aesthetic appeal of the profile and/or protect it from environmental conditions. Referring to FIG. 1, for example, such a capping layer may be applied via an extruder oriented at any desired angle to introduce a thermoplastic resin into a capping die 72. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or long fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die 72 may include various features known in the art to help achieve the desired application of the capping layer. For instance, the capping die 72 may include an entrance guide that aligns the incoming profile. The capping die may also include a heating mechanism (e.g., heated plate) that pre-heats the profile before application of the capping layer to help ensure adequate bonding.

Following optional capping, the shaped part 15 is then finally cooled using a cooling system 80 as is known in the art. The cooling system 80 may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a temperature of from about 10° C. to about 50° C., and in some embodiments, from about 15° C. to about 35° C.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

Referring again to FIG. 1, a pulling device 82 is positioned downstream from the cooling system 80 that pulls the finished profile 16 through the system for final sizing of the composite. The pulling device 82 may be any device capable of pulling the profile through the process system at a desired rate. Typical pulling devices include, for example, caterpillar pullers and reciprocating pullers. If desired, one or more calibration dies (not shown) may also be employed. Such dies contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

One embodiment of the hollow profile formed from the method described above is shown in more detail in FIG. 11 as element 16. As illustrated, the hollow profile 16 has a generally rectangular shape. An inner layer 4 is formed by the LFRT material that extends around the entire profile and defines an interior surface 5. An outer layer 6 is likewise formed by the CFRT material that extends around the perimeter of the inner layer 4 and positioned adjacent thereto. The thickness of these layers and the relative proportion of the LFRT and CFRT materials may be strategically selected to help achieve a particular tensile strength and transverse strength (e.g., flexural modulus) for the profile. For example, higher percentages of LFRT material (and/or thickness) generally result in higher transverse strength, while higher percentages of CFRT material (and/or thickness) generally result in higher tensile strength. To optimize these properties, the ratio of the weight of the CFRT layer to the weight of the LFRT layer is typically from about 0.2 to about 10, in some embodiments from about 0.4 to about 5, and in some embodiments, from about 0.5 to about 4. In this regard, the thickness of the inner layer 4 may be from about 0.1 to about 2.0 millimeters, in some embodiments from about 0.5 to about 1.5 millimeters, and in some embodiments, from about 0.6 to about 1.2 millimeters, and the thickness of the outer layer 6 may be from about 0.2 to about 4.0 millimeters, in some embodiments from about 0.5 to about 3.0 millimeters, and in some embodiments, from about 1.0 to about 2.0 millimeters. The total thickness of the layers 4 and 6 may likewise be from about 1.0 to about 4.0 millimeters, and in some embodiments, from about 2.0 to about 3.0 millimeters.

Figure 11:
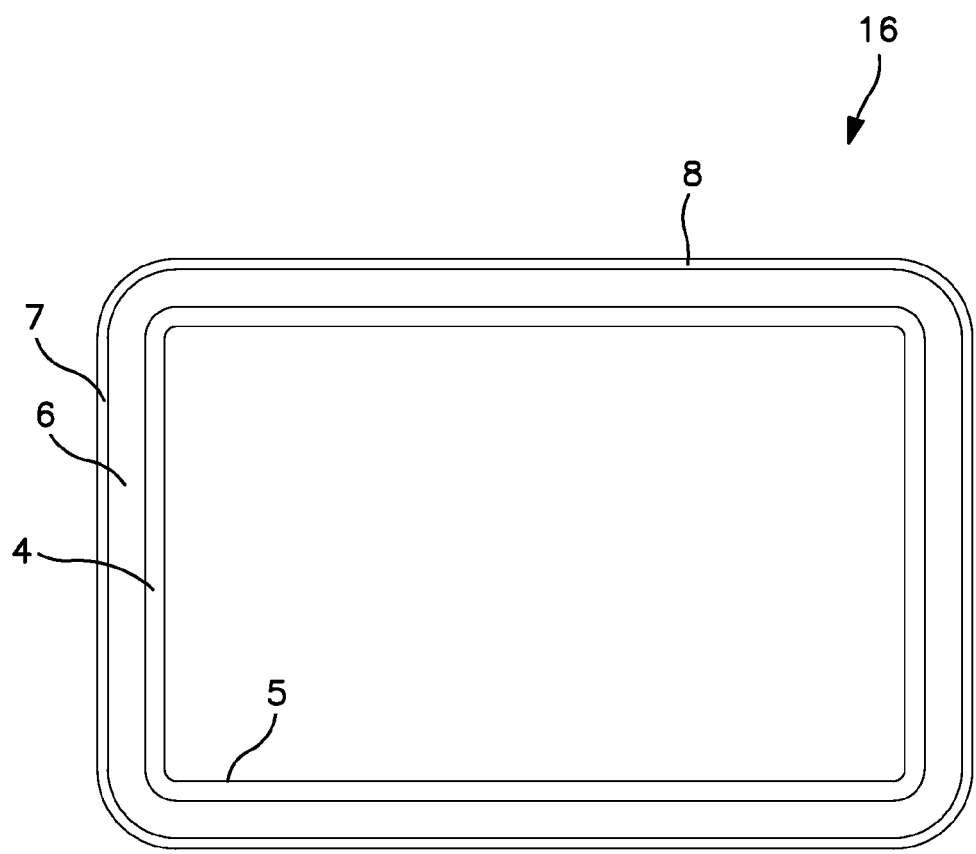
FIG. 11 is a cross-sectional view of one embodiment of a rectangular, hollow profile of the present invention.

The profile 16 of FIG. 11 also includes a capping layer 7 that extends around the perimeter of the outer layer 6 and defines an external surface 8 of the profile 16. The thickness of the capping layer 7 depends on the intended function of the part, but is typically from about 0.1 to about 5 millimeters, and in some embodiments, from about 0.2 to about 3 millimeters.

Figure 12:
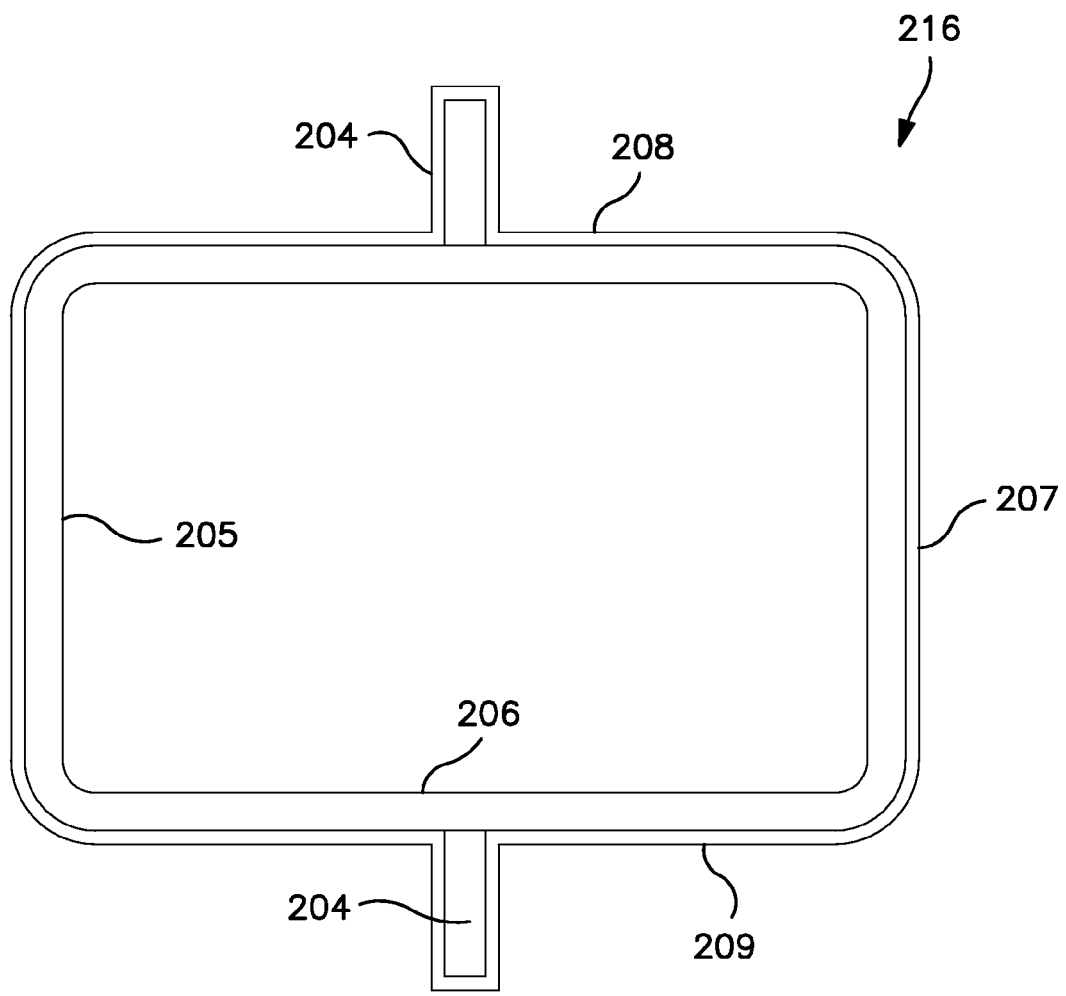
FIG. 12 is a cross-sectional view of another embodiment of a rectangular, hollow profile of the present invention.

In the embodiments described and shown above, the LFRT material is positioned around substantially the entire interior perimeter of the profile. However, it should be understood that this is not required, and that it may be desired in certain applications to apply the material only to specific locations that are advantageous according to a particular design. One example of such a profile is shown in more detail in FIG. 12. As illustrated, the profile 216 generally has a hollow, rectangular shape. In this embodiment, an inner layer 206 is formed by the CFRT material that extends around the entire profile and defines an interior surface 205. The thickness of the layer 206 may be similar to the CFRT layer described above with reference to FIG. 11. Contrary to the embodiment of FIG. 11, however, the profile 216 does not contain a continuous LFRT layer. Instead, LFRT material is located at discrete layers 204 at upper and lower surfaces 208 and 209 of the profile 216. Such discrete placement of the LFRT material may provide enhanced transverse strength at only those locations where it is needed for a particular application. A capping layer 207 may cover the periphery of the profile 216.

Figure 13:
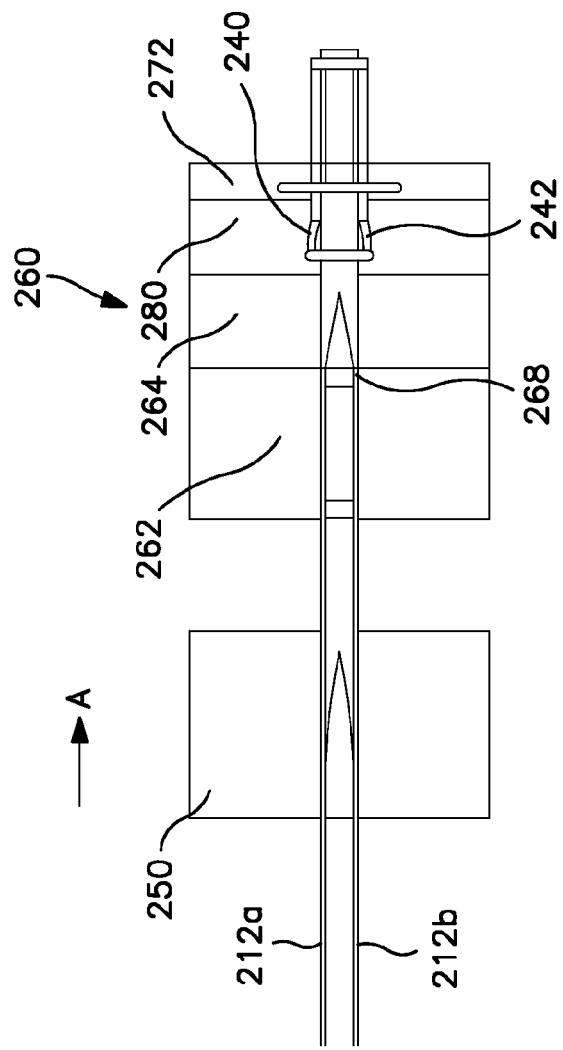
FIG. 13 is side view of one embodiment of a pre-shaping and pultrusion die system that may be employed to form the profile of FIG. 12.
Figure 14:
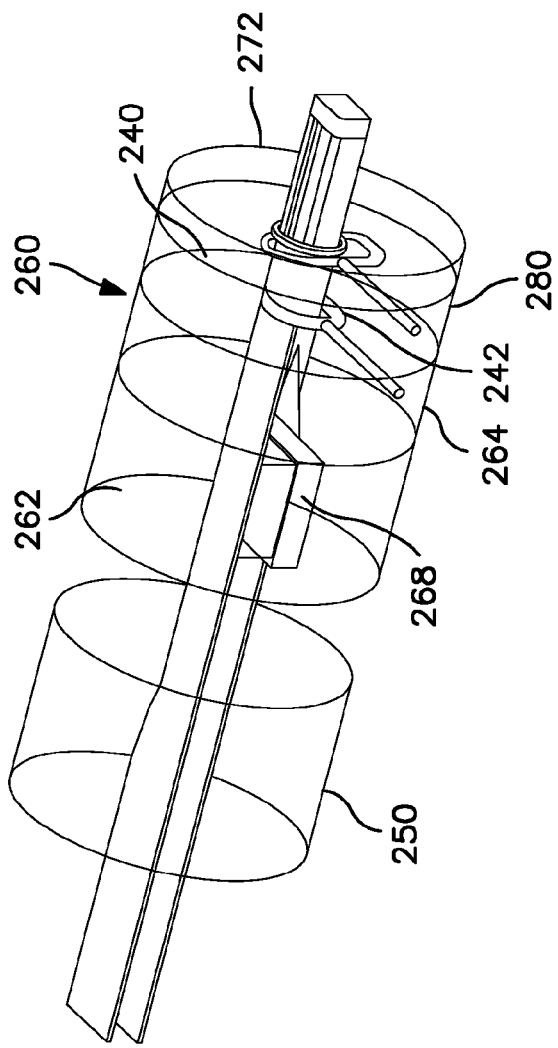
FIG. 14 is perspective view of the pre-shaping and pultrusion die system of FIG. 13.

FIGS. 13-14 illustrate one embodiment of the consolidation die 250 and pultrusion die 260 that may be employed to form the profile 216. Similar to the embodiments described above, the consolidation die 250 in this embodiment receives a first layer 212a and second layer 212b of continuous fiber material at an inlet end 256. The layers 212a and 212b are guided through channels (not shown) of the die 250 in a direction "A". As they pass through the channels, the widths of the layers 212a and/or 212b are optionally ribboned and connected at one side as described above. When in the desired position, the layers 212a and 212b are pulled into the pultrusion die 260, which employs a first die section 262, a second die section 264, and a mandrel 268 that extends therethrough. Together, each of these components helps shape the continuous fiber material. More particularly, as the continuous fiber layers pass over and around the mandrel 268 from its proximal to distal end, they assume the shape defined between the interior surface of the die 260 and an external surface of the mandrel, which in this embodiment, is a hollow rectangular shape. The long fiber material 281 is then introduced into a third die section 280 via an inlet portion, which is typically in the form of a cross-head die that extrudes the material at an input angle as mentioned above. In this particular embodiment, however, the long fiber material 281 is split into an upper stream 240 and a lower stream 242 within the third die section 280. As the streams 240 and 242 converge in the direction "A" of the material flow and are pulled through the die system, they form the upper and lower discrete layers 204, respectively, of the profile 216. A capping layer 207 may then be applied using a capping die 272 as shown.

Figure 15:
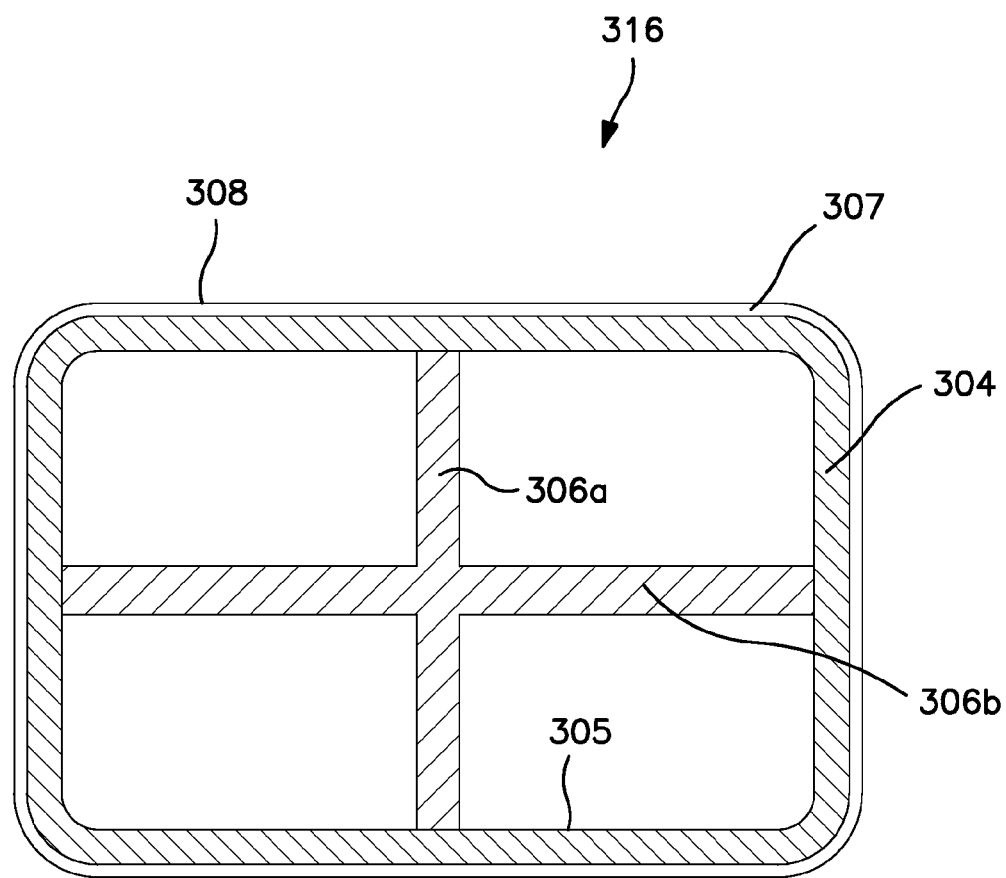
FIG. 15 is a cross-sectional view of another embodiment of a rectangular, hollow profile of the present invention.

Of course, other hollow profiles may be formed in the present invention. Referring to FIG. 15, for example, another embodiment of a generally rectangular, hollow profile 316 is shown in more detail. In this particular embodiment, an inner layer 304 is formed by the LFRT material that extends around the entire profile and defines an interior surface 305. The thickness of the layer 304 may be similar to the long fiber layer described above with reference to FIG. 11. Contrary to the embodiment of FIG. 11, however, the profile 316 does not contain a CFRT layer around the entire periphery of the profile. Instead, the CFRT material is provided as a discrete vertical layer 306a and horizontal layer 306b within the interior of the profile 316. A capping layer 307 is likewise provided that extends around the periphery of the inner layer 304 and defines an external surface 308 of the profile 316.

Figure 16:
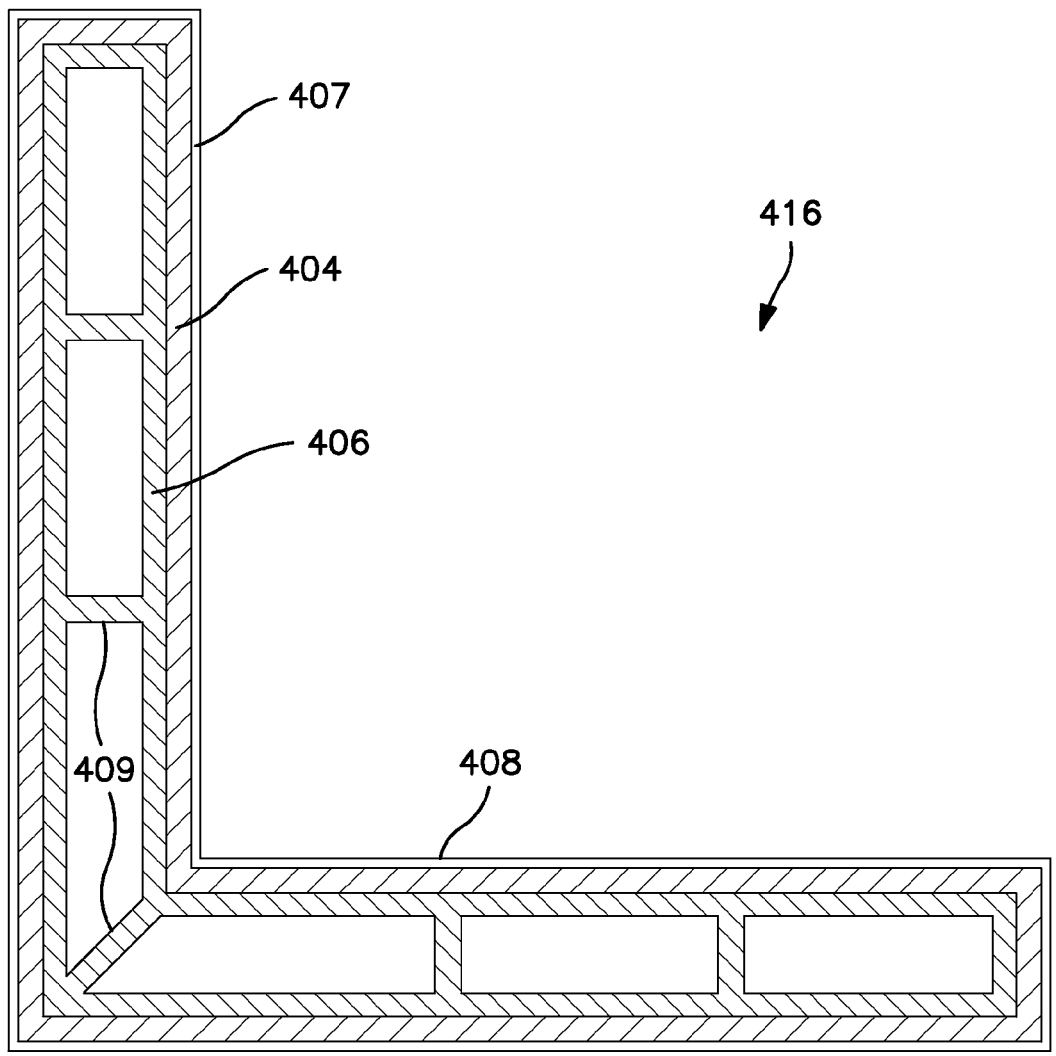
FIG. 16 is a cross-sectional view of one embodiment of an L-shaped, hollow profile of the present invention.

Still another embodiment of a hollow profile is shown in FIG. 16. In this embodiment, the profile 416 has a generally L-shaped cross-section. An inner layer 406 of the L-shaped profile 416 may include the CFRT material and an outer layer 404 may include the LFRT material. Discrete layers 409 of CFRT material may also be employed. Further, a capping layer 407 may extend around the entire periphery of the profile 416 and define an external surface 408 thereof.

The embodiments described above contain the LFRT and CFRT materials in separate layers so that selective reinforcement may be provided to the profile. However, this is by no means required. In fact, in certain embodiments of the present invention, the long fiber material is integrated into the continuous fiber ribbon so that the materials are not provided as separate layers. This may be accomplished, for instance, by incorporating the long fiber material into the continuous ribbon during impregnation.

Figure 17:
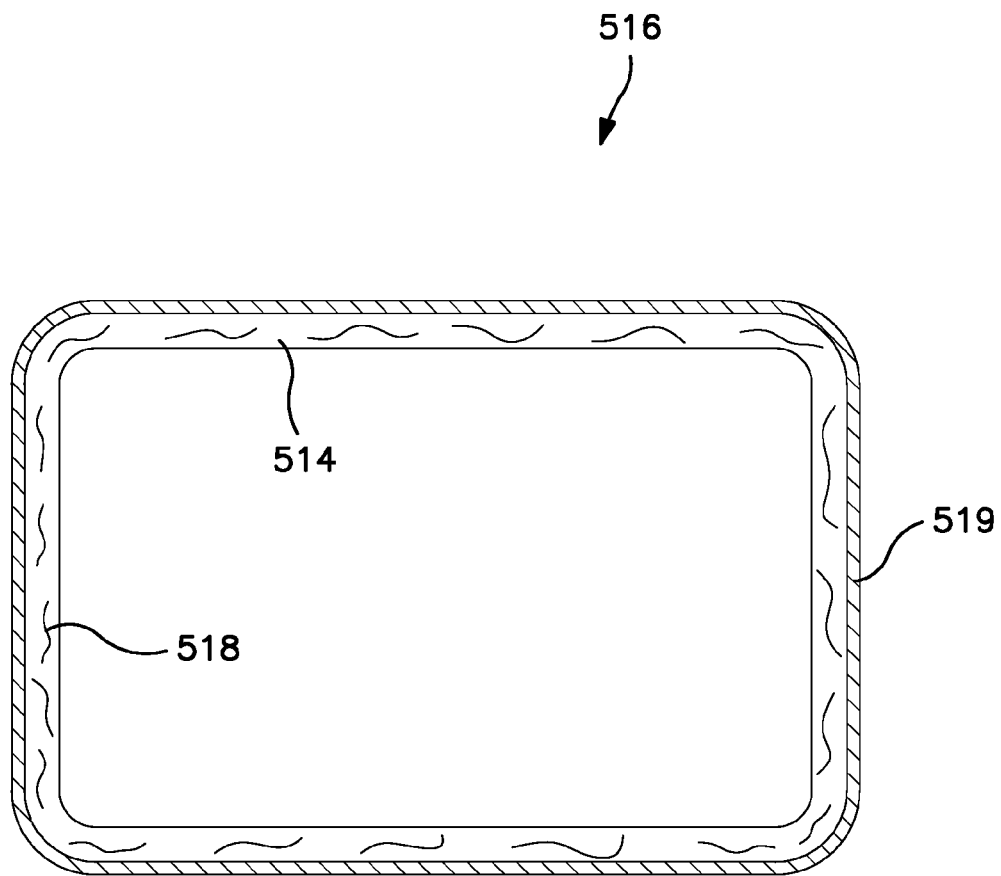
FIG. 17 is yet another embodiment of a rectangular, hollow profile of the present invention.

Referring again to FIGS. 2-3, for example, long fiber pellets (not shown) containing a plurality of long fibers randomly distributed within a second thermoplastic matrix may be supplied to the hopper 126 and combined with the first thermoplastic matrix 127. In this manner, the long fiber pellets are melt-blended with the first thermoplastic matrix used to impregnate the continuous fiber strands and create an extrudate 152 that contains continuous fibers, long fibers, and two different thermoplastic matrices, which may include the same or different polymers. In the alternative, the long fibers may be added directly to the hopper 126 without being pre-embedded with a thermoplastic matrix. In such embodiments, the first thermoplastic matrix will encapsulate both the continuous and long fibers. Regardless of the technique employed, however, the long fiber material may be distributed in a substantially homogeneous manner throughout the profile. One example of such a profile is shown in FIG. 17 as element 516. In this embodiment, the profile 516 is generally rectangular in shape and contains a continuous fiber ribbon 514 within which is distributed a plurality of long fibers 518. A capping layer 519 also extends around the perimeter of the ribbon 514 and defines an external surface of the profile 516. It should also be understood that such "hybrid" ribbons, which contain both continuous and long fibers, may also be combined with one or more additional ribbons as described above. These additional ribbons may contain continuous fibers, long fibers, or combinations thereof, and may be pre-manufactured or made in line.

As will be appreciated, the particular profile embodiments described above are merely exemplary of the numerous designs that are made possible by the present invention. Among the various possible profile designs, it should be understood that additional layers of continuous and/or long fiber material may be employed in addition to those described above. Further, the embodiments described above are generally considered "lineal" profiles to the extent that they possess a cross-sectional shape that is substantially the same along the entire length of the profile. It should be understood, however, that profiles may also be formed in the present invention that have a varying cross-sectional shape, such as curved, twisted, etc.

The present disclosure may be better understood with reference to the following example.

EXAMPLE

Continuous fiber ribbons were initially formed using an extrusion system as substantially described above and shown in FIGS. 2-3. Glass fiber rovings (E-glass, 2200 tex) were employed for the continuous fibers with each individual ribbon containing three (3) fiber rovings. The thermoplastic polymer used to impregnate the fibers was acrylonitrile butadiene styrene (ABS), which has a melting point of about 105° C. Each ribbon contained 60 wt. % glass fibers and 40 wt. % ABS. The resulting ribbons had a thickness of between 0.2 to 0.4 millimeters and a void fraction of less than 1%. Once formed, the ribbons were then fed to an extrusion/pultrusion line operating at a speed of 5 feet per minute. Prior to consolidation, the ribbons were heated within an infrared oven (power setting of 160). The heated ribbons were then supplied to a consolidation die having a U-shaped channel that received the ribbons and consolidated them together while forming the initial shape of the profile. Within the die, the ribbons remained at a temperature of about 121° C., just above the melting point of the ABS matrix. Upon consolidation, the resulting laminate was then briefly cooled with ambient air. The laminate was then passed through the pultrusion die as shown in FIG. 1. Long fiber pellets were applied to the interior section of the U-shaped profile at 246° C.

The resulting part was then supplied to a 1-inch land section to impart the final "U shape" and cooled using an oil cooled sizing unit set at a temperature of about 26° C. Air cooling was then employed to complete the cooling process. The profile had a thickness of approximately 3.2 millimeters and a width of approximately 40 millimeters. While this particular part formed had a U-shape, it should be understood that a substantially rectangular hollow profile may simply be formed from two different U-shaped laminates in the manner described above and shown herein.

Ten (10) different U-shaped profile samples were formed as described above with different amounts of continuous fibers and long fibers. The amount of long fibers was varied by using different percentages of long fibers in the pellets, ranging from 0 wt. % to 40. %, and the amount of continuous fibers was varied by using different numbers of ribbons, ranging from 2 to 7. The manner in which each of the samples was formed is reflected below in Table 1.

TABLE 1

| Sample | Long Fibers in Pellets (wt. %) | Number of Continuous Fiber Ribbons | Wt. Ratio of Continuous Fiber Material to Long Fiber Material |
|---|---|---|---|
| 1 | 0 | 7 | — |
| 2 | 20 | 2 | 1.21 |
| 3 | 20 | 3 | 1.99 |
| 4 | 20 | 4 | 3.20 |
| 5 | 30 | 2 | 0.72 |
| 6 | 30 | 3 | 1.54 |
| 7 | 30 | 4 | 2.34 |
| 8 | 40 | 2 | 0.57 |
| 9 | 40 | 3 | 0.95 |
| 10 | 40 | 4 | 1.52 |

To determine the strength properties of the U-shaped profile, three-point flexural testing was performed in accordance with ASTM D790-10, Procedure A. One transverse edge of the profile was supported with a fixture, and the load from the Instron meter was applied to the free edge of the U profile. The following equation was used to calculate the maximum stress load on the part: Maximum stress load=$(6*P_{max}*L)/w*t^2$ where $P_{max}$=maximum load, L=length of lever arm, w=sample width, t=sample thickness. The strength properties of the samples are set forth below in Table 2.

TABLE 2

| Sample | Maximum Flexural Strength (MPa) | Flexural Modulus (GPa) | Ratio of Flexural Modulus to Flexural Strength |
|---|---|---|---|
| 1 | 11.73 | 26.6 | 2268 |
| 2 | 35.39 | 6.2 | 175 |
| 3 | 32.36 | 8.7 | 269 |
| 4 | 32.76 | 13.7 | 418 |
| 5 | 30.94 | 7.87 | 254 |
| 6 | 27.17 | 13.55 | 499 |
| 7 | 26.57 | 14.87 | 560 |
| 8 | 27.93 | 11.82 | 423 |
| 9 | 26.57 | 13.75 | 518 |
| 10 | 29.66 | 14.75 | 497 |

It should be understood that the strength properties of the U-shaped parts referenced above would be substantially equivalent to a substantially rectangular hollow profile part due to the fact that such a profile is a combination of two U-shaped parts, and that the strength properties would be determined by cross-sectioning the hollow profile into a U-shaped part for testing purposes.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A hollow lineal profile comprising:
   a consolidated ribbon that contains a plurality of continuous fibers embedded within a first thermoplastic matrix and substantially oriented in a longitudinal direction;
   a plurality of long fibers, at least a portion of which are oriented at an angle relative to the longitudinal direction, wherein the ratio of the weight of the continuous fibers to the ratio of the weight of the long fibers is from about 0.2 to about 10;
   wherein the long fibers are included within a first layer of the profile and the ribbon is included within a second layer of the profile, the first layer being positioned adjacent to the second layer; and
   wherein the profile exhibits a flexural modulus and maximum flexural strength in the transverse direction, wherein the ratio of the flexural modulus to the maximum flexural strength is from about 50 to about 2200.

2. The hollow lineal profile of claim 1, wherein the ratio of the weight of the continuous fibers to the ratio of the weight of the long fibers is from about 0.5 to about 4.

3. The hollow lineal profile of claim 1, wherein the ratio is from about 200 to about 800.

4. The hollow lineal profile of claim 1, wherein the profile exhibits a flexural modulus of about 2 Gigapascals or more.

5. The hollow lineal profile of claim 1, wherein the profile exhibits a flexural modulus of from about 4 to about 20 Gigapascals.

6. The hollow lineal profile of claim 1, wherein the profile exhibits a maximum flexural strength of about 12 Megapascals or more.

7. The hollow lineal profile of claim 1, wherein the profile exhibits a maximum flexural strength of from about 15 to about 50 Megapascals.

8. The hollow lineal profile of claim 1, wherein the continuous fibers, the long fibers, or both, include glass fibers, carbon fibers, or a combination of glass and carbon fibers.

9. The hollow lineal profile of claim 1, wherein the first thermoplastic polymer matrix includes a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyamide, or a combination thereof.

10. The hollow lineal profile of claim 1, wherein the long fibers are embedded within a second thermoplastic matrix.

11. The hollow lineal profile of claim 10, wherein the second thermoplastic polymer matrix includes a polyolefin, polyether ketone, polyetherimide, polyarylene ketone, liquid crystal polymer, polyarylene sulfide, fluoropolymer, polyacetal, polyurethane, polycarbonate, styrenic polymer, polyester, polyamide, or a combination thereof.

12. The hollow lineal profile of claim 1, wherein the ribbon has a void fraction of about 2% or less.

13. The hollow lineal profile of claim 1, wherein about 10% or more of the long fibers are oriented at an angle relative to the longitudinal direction.

14. The hollow lineal profile of claim 1, wherein the profile has a generally rectangular shape.

15. The hollow lineal profile of claim 1, wherein the first layer forms an inner layer of the hollow profile.

16. The hollow lineal profile of claim 15, wherein the second layer extends substantially around the periphery of the first layer.

17. The hollow lineal profile of claim 15, wherein the second layer is located in one or more discrete regions adjacent to the first layer.

18. The hollow lineal profile of claim 1, wherein the second layer forms an inner layer of the hollow profile.

19. The hollow lineal profile of claim 18, wherein the first layer extends substantially around the periphery of the second layer.

20. The hollow lineal profile of claim 18, wherein the first layer is located in one or more discrete regions adjacent to the second layer.

21. The hollow lineal profile of claim 1, wherein the cross-section shape of the profile is substantially the same along the entire length of the profile.

22. The hollow lineal profile of claim 1, further comprising a capping layer that defines an external surface of the profile.

23. A hollow lineal profile comprising:
- a consolidated ribbon that contains a plurality of continuous fibers embedded within a first thermoplastic matrix and substantially oriented in a longitudinal direction;
- a plurality of long fibers incorporated into the consolidated ribbon, at least a portion of which are oriented at an angle relative to the longitudinal direction, wherein the ratio of the weight of the continuous fibers to the ratio of the weight of the long fibers is from about 0.2 to about 10; and
- wherein the profile exhibits a flexural modulus and maximum flexural strength in the transverse direction, wherein the ratio of the flexural modulus to the maximum flexural strength is from about 50 to about 2200.

24. The hollow lineal profile of claim 23, wherein the ratio of the weight of the continuous fibers to the ratio of the weight of the long fibers is from about 0.5 to about 4.

25. The hollow lineal profile of claim 23, wherein the ratio is from about 200 to about 800.

26. The hollow lineal profile of claim 23, wherein the profile exhibits a flexural modulus of about 2 Gigapascals or more.

27. The hollow lineal profile of claim 23, wherein the profile exhibits a maximum flexural strength of about 12 Megapascals or more.

28. The hollow lineal profile of claim 23, wherein the long fibers are embedded within a second thermoplastic matrix.

29. The hollow lineal profile of claim 23, wherein the ribbon has a void fraction of about 2% or less.

30. The hollow lineal profile of claim 23, wherein about 10% or more of the long fibers are oriented at an angle relative to the longitudinal direction.

31. The hollow lineal profile of claim 23, further comprising a capping layer that defines an external surface of the profile.

* * * * *